United States Patent [19]

Newman

[11] 4,354,562
[45] Oct. 19, 1982

[54] ELECTRONIC WEIGHING DEVICE

[76] Inventor: Martin H. Newman, 82 Talbot Way, Seekonk, Mass. 02771

[21] Appl. No.: 212,357

[22] Filed: Dec. 3, 1980

[51] Int. Cl.³ ............................................. G01G 3/14
[52] U.S. Cl. ............................................. 177/210 EM
[58] Field of Search ................... 177/210 EM, 210 C

[56] References Cited

U.S. PATENT DOCUMENTS 3,498,397  3/1970  De Santo ................... 177/210 EM
4,173,263  11/1979  Meeks ......................... 177/210 EM
4,266,263  5/1981  Haberl et al. ............... 177/210 C X

OTHER PUBLICATIONS

Hall Effect in Measurements of Mechanical Displacements and Vibrations; M. Nalecz, Bulletin de L'Academic Polonaise Des Sciences, 1961, pp. 469-475.
Mechanical Measurement-Use of Hall Effect-M. Nalecz, Electronic Techn., Jan. 1961-pp. 15-17.

Primary Examiner—George H. Miller, Jr.
Attorney, Agent, or Firm—George W. Neuner

[57] ABSTRACT

An electronic weighing device is described wherein a Hall effect device and its associated magnetic field is used to provide an electrical signal proportional to the weight of an object and the signal is used to operate a display device. In one embodiment the Hall effect device and a magnet are mounted between a base platform and the weighing platform of the scale to respond to relative motion therebetween and the weighing platform is supported from the base platform by a plurality of resilient support members.

9 Claims, 2 Drawing Figures

ELECTRONIC WEIGHING DEVICE

FIELD OF THE INVENTION

This invention relates generally to weighing devices and more particularly, to such devices for weighing individual persons, sometimes referred to as bathroom scales, using electronic circuitry and preferably digital display techniques.

BACKGROUND OF THE INVENTION

Recently scales which have been made and sold generally for home use have introduced digital displays of weights and have, accordingly, used appropriate electronic techniques for generating the digital signals required. It is desirable that such devices be accurate and provide for good repeatability so that the persons using the scales can be assured that the weight displayed is not adversely affected by environmental conditions such as temperature and humidity which have sometimes affected the accuracy of the presently available digital display devices. In addition it is also desirable that such devices be relatively inexpensive so that the average consumer can afford them.

Although Hall effect devices have been suggested for use in measuring mechanical displacement and vibrations by, for instance, Nalecz in *Electrotechnics*, Vol. IX, No. 8, pp. 469 (1961), it was never previously considered that such Hall effect devices could be used as the transducer in a scale, particularly an inexpensive bathroom type scale.

SUMMARY OF THE INVENTION

I have discovered that an inexpensive accurate, and precise digital readout weighing device can be made by using a suitably mounted linear Hall effect device to measure displacement for an electric readout scale. In accord with the invention, a Hall effect device is mounted so that relative movement between the Hall effect device and the associated magnetic field occurs in an accurately defined path. Relative movement, resulting from pressure (i.e., the weight) placed upon the scale, causes a change in output voltage of the Hall effect device proportional to the displacement (and thus the quantity of weight). The output voltage is converted to a digital signal by a suitable electrical circuit and the digital signal is used to operate a digital display device.

In one embodiment of the invention, a scale comprises a support platform and a weighing platform spaced apart by a plurality of resilient members. A Hall effect device and its associated magnetic field is located between the support platform and the weighing platform to sense relative movement due to the force of an object being weighed. As aforesaid, the relative movement causes an output signal that is converted and displayed on a digital readout device.

BRIEF DESCRIPTION OF THE DRAWINGS

The invention will be described in more detail with the help of the drawings wherein.

DESCRIPTION OF THE INVENTION

In accord with the invention, a precision weighing device comprising a linear Hall effect device to measure displacement responsive to the weight of a subject, an electrical circuit for converting the output of the Hall effect device to a suitable display mode, and an electric readout device for displaying the weight of the subject is described. The measuring device comprises a weighing platform on which the subject to be weighed is placed. The displacement of the weighing platform is coupled to the Hall effect device by suitable conventional mechanical means. Such mechanical means can be readily devised by the skilled mechanic. An example of a mechanical linkage suitable for converting vertical displacement into horizontal displacement is described in U.S. Pat. No. 3,666,031, which is hereby incorporated by reference.

Displacement of the weighing platform through the mechanical coupling causes relative motion between the Hall effect device and its associated magnetic field. The relative motion causes a change in voltage output of the Hall effect device in proportion to the original displacement. This output voltage is converted by a suitable electrical circuit to a form capable of being displayed electrically. Circuits for converting such voltage changes to, for instance, digital form for operating a digital display device are well known and, thus, need not be described here. A particularly preferred circuit for this purpose was developed to assure accurate and precise measurements and this preferred circuit is described in copending U.S. patent application Ser. No. 186,315 filed on Sept. 11, 1980 by Anton Mavretic entitled "Weighing Devices Using Electronic Circuitry", which is assigned to the same assignee and which is hereby incorporated by reference.

Figure 1:
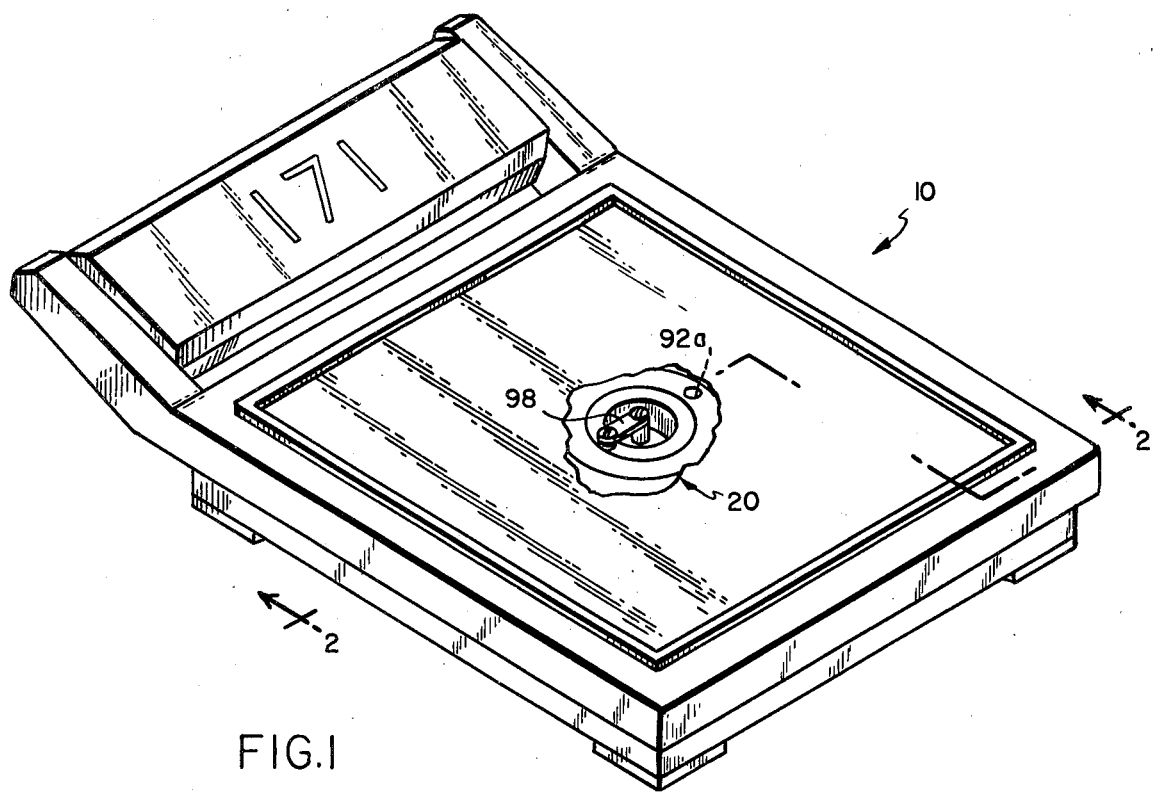
FIG. 1 is an isometric view partially cut away of one embodiment of a scale in accord with the present invention.
Figure 2:
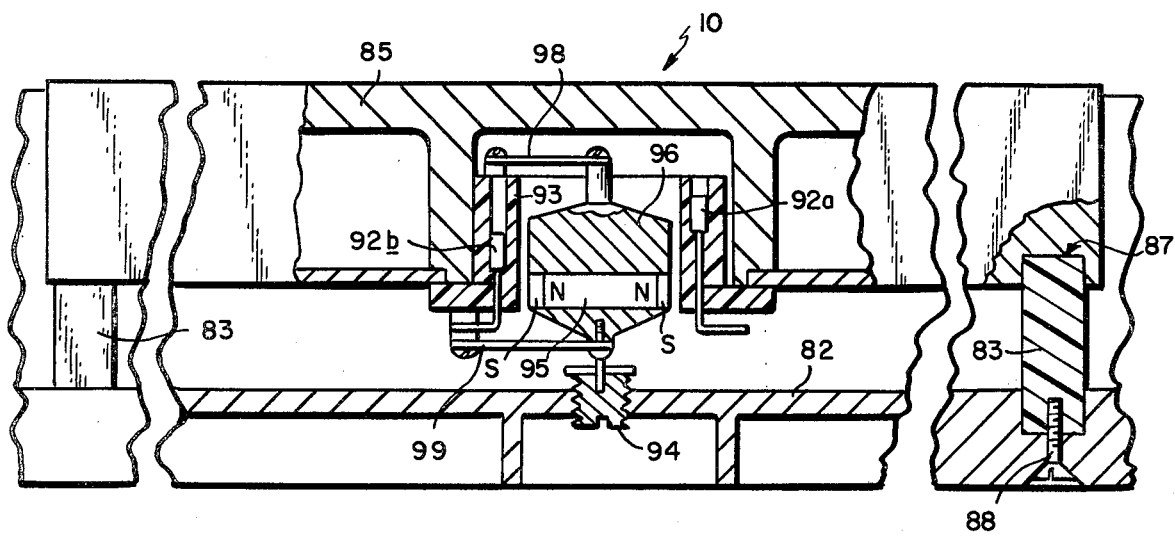
FIG. 2 is a cross-sectional view, along line 2—2 of FIG. 1 illustrating one embodiment of a scale in accord with the present invention.

One embodiment of the invention is illustrated by the drawings wherein FIG. 1 shows a platform scale 10 having a sensing device 20 positioned between a weighing platform 85 and a support platform 82 as is shown in more detail in FIG. 2. This mounting configuration assures precisely defined relative movement between the metal strip of the Hall effect device and its associated magnetic field.

The scale 10 comprises a base plate or support platform 82 and a weighing platform 85 spaced apart by a plurality of resilient members 83 which support the weighing platform 85 and allow relative movement. In this specific embodiment four such resilient members 83 are used (not illustrated), one located in each corner. The resilient members are made from polyurethane (for example, that sold under the tradename TEXIN by Mobay Chemical Corporation). A square cross-section having an area of 0.15 in.$^2$. is used in this embodiment, however any convenient cross-sectional shape having the desired area to meet design requirement can be used. The resilient members are preferably attached to both the support platform and the weighing platform so that the end faces of the resilient members are always in contact with said platforms during use of the scale.

Although polyurethane has been used in this embodiment any resilient material having a substantially linear compressive stress-strain relationship can be used. The total area of support is calculated to provide the desired range of compression under design loads.

Relative movement of the weighing platform 85 is measured by the sensing device which comprises two Hall effect devices 92a and 92b and magnet 95. The linear Hall effect devices 92a and 92b are positioned in a cylinder 93 of a non-magnetic material and rigidly attached through suitable structure to the weighing platform 85. Two linear Hall effect devices are used in this embodiment to extend the range in which a linear response is obtained. However, it is readily apparent that only one such Hall effect device can be used if the design maximum movement allows operation in the linear response range. Preferably the sensing device is located at the geometric center of the configuration of the resilient support members.

A magnet 95 is disposed within cylinder 93 and is positioned by means of a cylindrical-shaped mounting 96 also made from a non-magnetic material. The magnet 95 provides the associated magnetic field for operation of the Hall effect devices. The magnet 95 and its mounting 96 are supported by flexible spring members 98 and 99 with lower end in contact with support platform 82. The magnet can move relative to the Hall effect devices 92a and 92b through cylinder 93 as weighing platform 85 is depressed due to an object being weighed. Leaf springs 98 and 99 which are attached at one end to mounting 96 and at the other end to structure forming part of the weighing platform permit such relative movement while retaining the mounting 96 in firm contact with support platform 82 for a reference plane. The contact point of mounting 96 with platform 82 is conveniently the adjustment screw 94 which allows the scale to be zeroed.

The resilient support members 83 are preferably fixedly attached to the weighing platform and the support platform. In the embodiment illustrated in FIG. 2, the top of member 83 is cemented or otherwise bonded to the weighing platform at 87 and the bottom of member 83 is held in contact with the support platform by screw 88.

When the magnet and its associated magnetic field is moved relative to the Hall effect device by placing a weight on the platform of the scale, a change in voltage is induced that is proportional to the distance moved. This change in voltage can be converted by known electrical circuits to provide a digital readout of the weight. Suitable circuits for this purpose can be provided in routine manner by those skilled in the art. Preferably, the output of the Hall effect devices is converted to a digital display device. A preferred circuit for this use is described in the copending application Ser. No. 186,315 of Mavretic, supra.

Hall effect devices useful in the present invention are commercially known as linear Hall effect devices. Such Hall effect devices are available from Honeywell, Texas Instruments, or Sprague.

The invention has been described in detail with reference to the preferred embodiments thereof. However, it will be appreciated that those skilled in the art, upon reading this disclosure, may make modifications and improvements within the spirit and scope of the claim.

For instance other means for mounting the Hall effect device and its associated magnet and coupling the movement of the weighing platform with the Hall effect device or its associated magnet to produce relative motion therebetween may be devised.

I claim:

1. An electronic weighing device comprising:
a weighing surface for receiving an object to be weighed, so that when the object is placed on said weighing surface, the surface is displaced in response to the weight of the object acting on it;
sensing means for sensing the displacement of said weighing surface and providing an electrical output signal that is proportional to the distance moved;
display means for displaying the weight of said object; and
circuit means for converting the output signal of said sensing means to a form suitable for operating said display means;
wherein said sensing means comprises a linear Hall effect device and its associated magnetic field.

2. The weighing device of claim 1 wherein said circuit means converts the output signal to a digital signal.

3. The weighing device of claim 1 wherein said display means is a digital display device.

4. The weighing device of claim 1 wherein one of the Hall effect device or a magnet that provides its associated magnetic field is attached to the weighing surface for movement therewith and the other of the Hall effect device or magnet is supported on a stationary surface of the weighing device.

5. An electronic weighing device comprising:
a stationary surface;
a weighing surface supported from said stationary surface for relative motion therebetween;
a plurality of resilient support members supporting said weighing surface, so that the resilience of said members permits said relative motion between the stationary surface and the weighing surface;
a linear Hall effect device and a magnet arranged to sense said relative motion between said stationary surface and said weighing surface and to produce an output signal proportional to the distance moved;
display means for displaying the weight of an object placed on the weighing surface; and
circuits means for converting the output signal to a form suitable for operating said display means.

6. The weighing device of claim 5 further wherein said device comprises four support members.

7. The weighing device of claim 5 wherein said support members are an elastomeric material.

8. The weighing device of claim 7 wherein said elastomeric material is polyurethane.

9. The weighing device of any claims 5 through 8 wherein said display means is a digital display device.

* * * * *